(12) United States Patent
Su et al.

(10) Patent No.: US 7,991,924 B2
(45) Date of Patent: Aug. 2, 2011

(54) METHOD AND SYSTEM FOR INITIALIZING DEVICES

(75) Inventors: Chun-Yuan Su, Taipei (TW); I-Lin Hsieh, Taipei (TW); Chi-Feng Lin, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 43 days.

(21) Appl. No.: 11/610,631

(22) Filed: Dec. 14, 2006

(65) Prior Publication Data

US 2008/0126783 A1 May 29, 2008

(30) Foreign Application Priority Data

Jul. 6, 2006 (TW) ................................ 95124603 A

(51) Int. Cl.
*G06F 3/00* (2006.01)
(52) U.S. Cl. .............................. 710/10; 710/8
(58) Field of Classification Search ................ 710/10, 710/8
See application file for complete search history.

(56) References Cited

U.S. PATENT DOCUMENTS

| | | | | | |
|---|---|---|---|---|---|
| 4,845,667 | A | * | 7/1989 | Hoptner et al. | 701/102 |
| 5,652,844 | A | * | 7/1997 | Harwood, III | 710/104 |
| 5,675,794 | A | * | 10/1997 | Meredith | 713/1 |
| 5,719,396 | A | * | 2/1998 | Jack et al. | 250/338.5 |
| 5,787,306 | A | * | 7/1998 | Michael | 710/9 |
| 6,311,285 | B1 | * | 10/2001 | Rodriguez et al. | 713/401 |
| 6,446,180 | B2 | * | 9/2002 | Li et al. | 711/167 |
| 6,567,868 | B1 | * | 5/2003 | Tran et al. | 710/60 |
| 2004/0098699 | A1 | * | 5/2004 | Breejen et al. | 716/15 |
| 2005/0035781 | A1 | * | 2/2005 | Chen et al. | 326/38 |

OTHER PUBLICATIONS

TW Office Action mailed Mar. 25, 2009.

* cited by examiner

*Primary Examiner* — Alford W Kindred
*Assistant Examiner* — Farley Abad
(74) *Attorney, Agent, or Firm* — Thomas|Kayden

(57) ABSTRACT

A system for a first device to initialize a second device is disclosed. The initialization bus is coupled between the first device and the second device. During an initialization period, the first device triggers at least one transmission command through the initialization bus to transmit at least one initial value to the second device via the initialization bus.

11 Claims, 3 Drawing Sheets

METHOD AND SYSTEM FOR INITIALIZING DEVICES

BACKGROUND OF THE INVENTION

1. Field of the Invention

The invention relates to a method and system for initializing a device, and more particularly to a method and system for transmitting initial state values via a bus during an initialization period.

2. Description of the Related Art

In an electronic system, such as a computer system, pins of a device (e.g., a chip) are used to design strapping functions in order to setup initial states of the device or enable the device to support additional functions. Strapping functions are configured to set the initial states, such as the frequency of a phase lock loop (PLL), the turned-on or turned-off state of a specific function (e.g., test mode of the device), and the setting of other functions.

Because there are numerous initial state values, if the number of pins reserved for the strapping functions is increased to setup the initial states, the size and manufacturing cost of the device are greatly increased. To avoid this problem, some general-function signal pins of the device are used to provide initial levels by pull-up or pull-down resistors. The device then latches these initial levels when effective transition edges of a system-power-completed signal occur, thus, the purpose of setup initial states is achieved. Because pads of the general-function signals are ti-state isolated, the values of the resistor are latched before the system power is completed (the system-power-completed signal is effective), thus, the initial levels are latched correctly. The pull-up or pull-down resistors, however, affect the quality of the general-function signals in a normal operation. Thus, the pull-up or pull-down resistors are only applied to lower frequency general-function signals.

FIG. 1 is a block diagram of a conventional electronic system 10 with strapping functions. The electronic system 10 comprises a first device 11 and a second device 12. The strapping functions are applied in general-function signals S1 to Sn between the first device 11 and the second device 12. The general-function signals S1 to Sn are selectively pulled up or down by jumpers J1 to Jn, respectively. The second device 12 comprises a system-power-completed signal Power_OK. FIG. 2 is waveform diagram of the signals when the second devices 12 perform the strapping functions. As shown in FIG. 2, when the system-power-completed signal Power_OK is transited to an effective rising edge, the pulled-up or pulled-down values of the general-function signals S1 to Sn are latched. The general-function signals S1 to Sn, however, can only provide n bits initial values to be setup. Moreover, pulling resistances up or down affects the quality of general-function signals S1 to Sn in a normal operation.

BRIEF SUMMARY OF THE INVENTION

Methods for initializing devices are provided. An exemplary embodiment of a method for initializing devices provides a first device setting up initial states of a second device. At least one transmission command is triggered by the first device through an initialization bus in an initialization period. At least one initial value is then transmitted to the second device via the initialization bus according to the transmission command.

An exemplary embodiment of a system for a first device to initialize a second device. A initialization bus is coupled between the first device and the second device. In an initialization period, the first device triggers at least one transmission command through the initialization bus to transmit at least one initial value to the second device via the initialization bus. In some embodiments, the first device further comprises a multiplexing mechanism for switching the initialization bus to connect a jumper or not.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
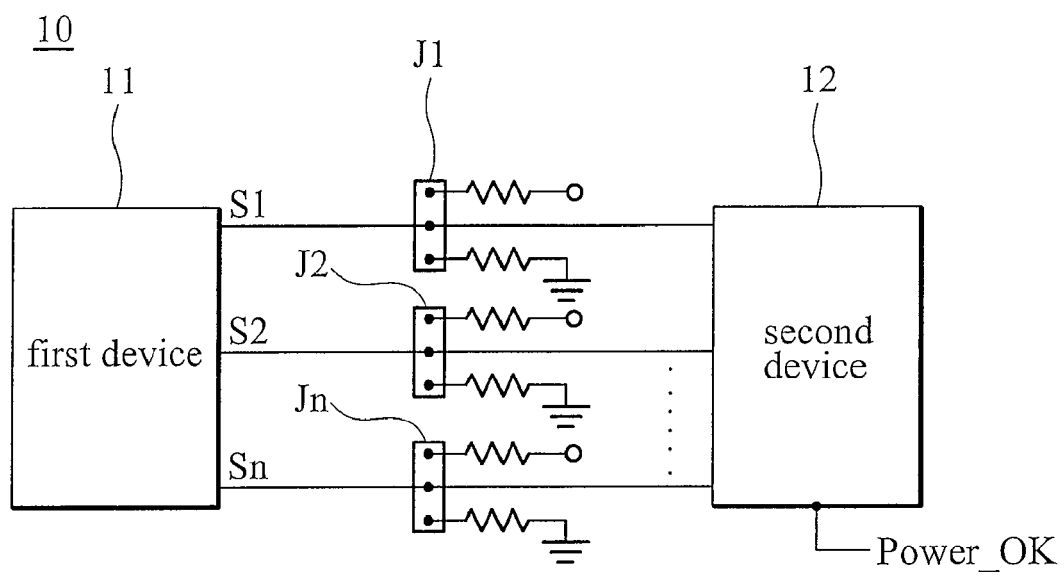
FIG. 1 is a block diagram of a conventional electronic system with strapping functions.
Figure 2:
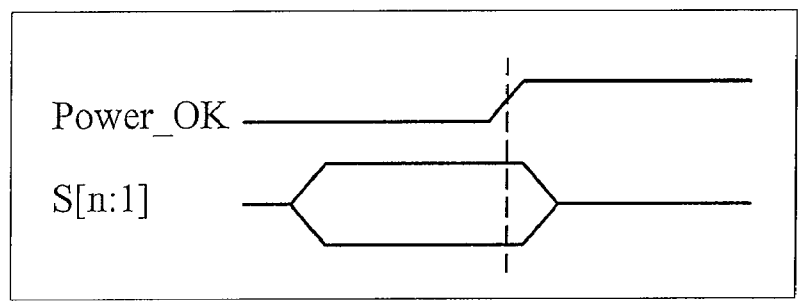
FIG. 2 is waveform diagram of the signals when a second device in FIG. 1 performs the strapping functions.

The following description is carrying out the invention. This description is made for the purpose of illustrating the general principles of the invention and should not be taken in a limiting sense. The scope of the invention is best determined by reference to the appended claims.

Methods for initializing devices with pin strapping functions are provided. The methods can overcome drawbacks of the limited number of general-function signal lines, which is insufficient for setting up all initial states. The methods also can overcome the effect upon normal signals from additional resistors. The methods utilize an existing bus to perform strapping functions many times to achieve the purpose of latching any number of initial values. The methods further utilize a multiplexing mechanism to switch the bus to connect jumpers or not when the bus performs the strapping functions and operates normally, thus, the resistors for the strapping functions do not affect the normal operation of the devices.

Electronic systems for initializing devices are provided. In an exemplary embodiment of an electronic system in FIG. 3, an electronic system 20 comprises a first device 21 and a second device 22. An initialization bus S1 to Sn is coupled between the first device 21 and the second device 22, and the bus S3 to Sn of the initialization bus S1 to Sn is coupled to jumpers J3 to Jn. The second device 22 comprises a power-completed signal Power_OK and a reset signal Reset. When the power-completed signal Power_OK is at a high level, the second device 22 prepares to perform self-starting. When the reset signal Reset is at the high level, the second device 22 completes the self-starting and begins to operate normally. The first device 21 is used to setup initial states of the second device 22 and controls the power-completed signal Power_OK and the reset signal Reset. The first device 21 comprises a multiplexing mechanism 212 to switch the bus S3 to Sn to connect the jumpers J3 to Jn or not. When the first device 21 setups the initial state of the second device 22, the bus S3 to Sn is connected to the jumpers J3 to Jn to latch required initial values. After the second device 22 starts, the bus S3 to Sn is not connected to the jumpers J3 to Jn, so that the jumpers J3 to Jn do not interfere with signals on the bus S3 to Sn.

The first device 21 transmits a latch signal by the bus S1 of the initialization bus S1 to Sn and triggers a transmission command to the bus S3 to Sn at each rising edge of the latch signal. The bus S3 to Sn transmits the initial values with (n−2) bits to the second device 22 according to the transmission command. A clock frequency of the latch signal is not limited to a specific frequency but required to match a frequency the initialization bus S1 to Sn can carry. Before the power-completed signal Power_OK is enabled, the first device 21 triggers the transmission command at each rising edge of the latch signal, thus, the bus S3 to Sn transmits the initial values with (n−2) bits to the second device 22. Because the transmission command enables the bus S3 to Sn to transmit initial values with (n−2) bits to the second device 22, the number of the transmission signals and the number of the transmitted initial values are increased when the number of rising edges of the latch signal required for triggering is increased.

As described above, after the power-completed signal Power_OK is enabled, the second device 22 self-starts. Thus, before the second device 22 self-starts, initial value setup should be complete so the second device 22 can start normally according to the correct initial values. After the second device 22 has started, the reset signal Reset is enabled. Thus, the power-completed signal Power_OK should be enabled before the reset signal Reset. The period before the power-completed signal Power_OK enabled is regarded as an initialization period of the second device 22.

The bus S2 is used to transmit a start signal. When the start signal is enabled, the second device 22 begins to receive the initial values via the bus S3 to Sn. The first device 21 controls the length of the initialization period, in other words, the first device 21 controls the suitable time at which the power-completed signal Power_OK is enabled. The first device 21 also controls the frequency of the latch signal and the start signal for transmitting a plurality of initial values.

The initialization bus S1 to Sn is designed as a special bus for an initialization function or a bus shared by the initialization function and a general function. When the initialization function or the general function is performed, the first device 21 determines the initialization bus S1 to Sn is connected to the jumpers J3 to Jn or not by the multiplexing mechanism 212. When the general function is performed, the initialization bus S1 to Sn is isolated from the jumpers J3 to Jn, thus, the quality of signals on the initialization bus S1 to Sn is not affected. After the initialization period, the initialization bus S1 to Sn is switched for the general functions, and the timing thereof is switched to the timing of general-function signals.

Figure 3:
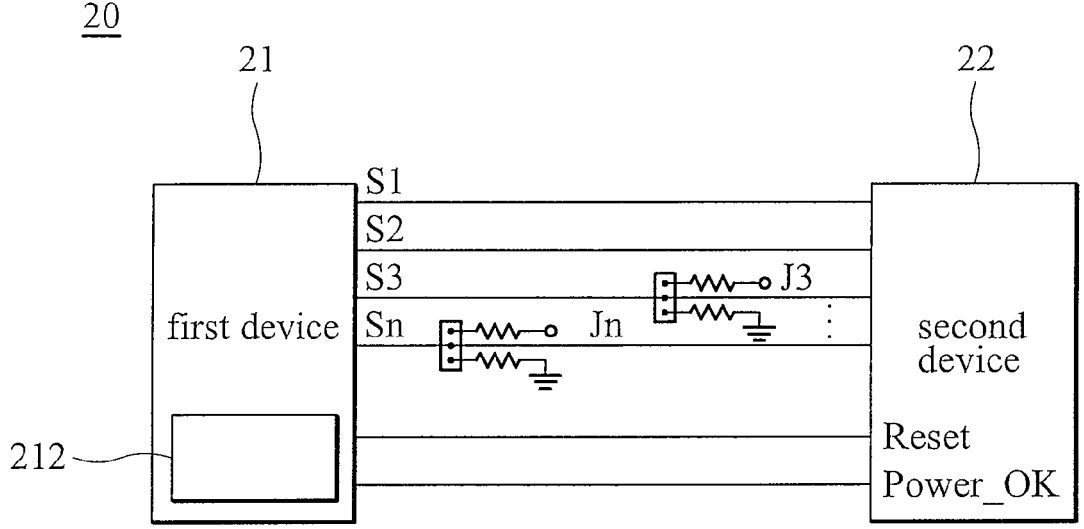
FIG. 3 shows an exemplary embodiment of an electronic system for initializing a device.
Figure 4:
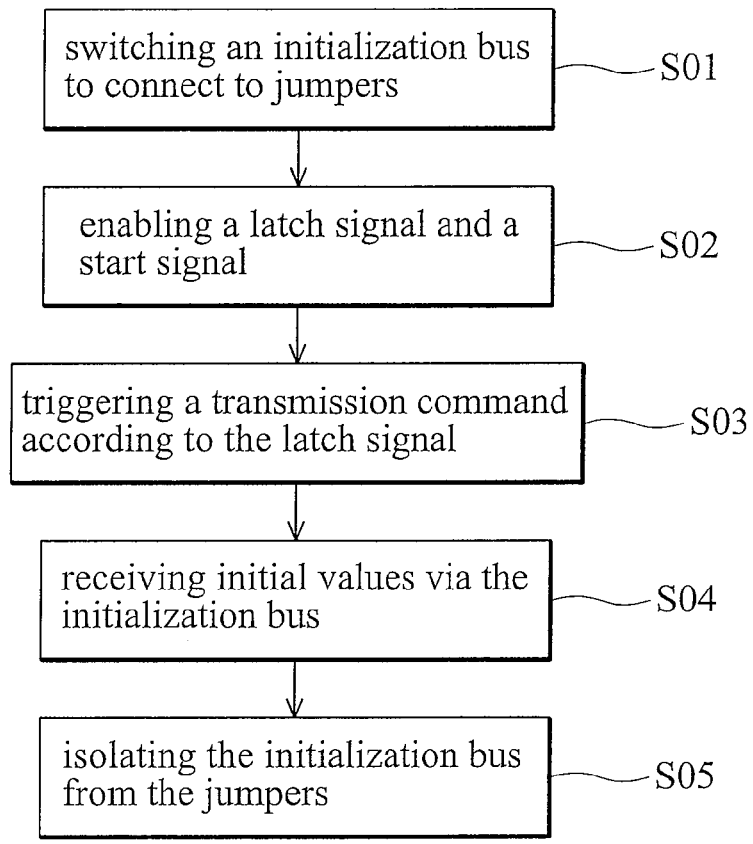
FIG. 4 is a flowchart of an exemplary embodiment of a method for initializing a device.

FIG. 4 is a flowchart of an exemplary embodiment of a method for initializing a device. Referring to FIGS. 3 and 4, before a power-completed signal Power_OK of a second device 22 is enabled, an initialization bus S1 to Sn is switched to connected to jumpers J3 to Jn (step S01), thus, a first device 21 can perform a strapping function by the jumpers J3 to Jn, in other words, the first device 21 provides initial values of the second device 22 according to level values of the jumpers J3 to Jn. The first device 21 then enables a start signal, such that the second device 22 begins to receive the initial values transmitted by the bus S3 to Sn of the initialization bus S1 to Sn (step S02). In step S02, the first device 21 further transmits a latch signal according to a clock frequency to provide a clock of transmitting the initial values via the bus S3 to Sn. In order to successfully receive the initial values by the second device 22, the first device 21 can transmit the latch signal as the start signal is enabled.

The first device 21 triggers a transmission command at each rising edge of the latch signal (step S03). The bus S3 to Sn transmits the initial values to the second device 22 according to the transmission command. The initial values are obtained according to level values of the jumpers J3 to Jn, and initial values with (n−2) bits are generated each time the transmission command is triggered. The second device 22 receives the initial values transmitted by the bus S3 to Sn (step S04) and stores it in a register (not shown in FIG. 3). The second device 22 setups a corresponding reference according to the initial values and operates normally.

If the second device 22 receives all the initial values, a multiplexing mechanism 212 of the first device 21 isolates the initialization bus S1 to Sn from the jumpers J3 to Jn to return to a normal operation path (step S05). At the same time, the first device 21 disabled the start signal to stop the second device 22 receiving the initial values. The first device 21 also stops transmitting the latch signal and triggering the transmission command. If the second device 22 has not yet received all the initial values, the first device 21 further triggers the transmission command (back to Step S03) until the second device 22 receives all the initial values.

Figure 5:
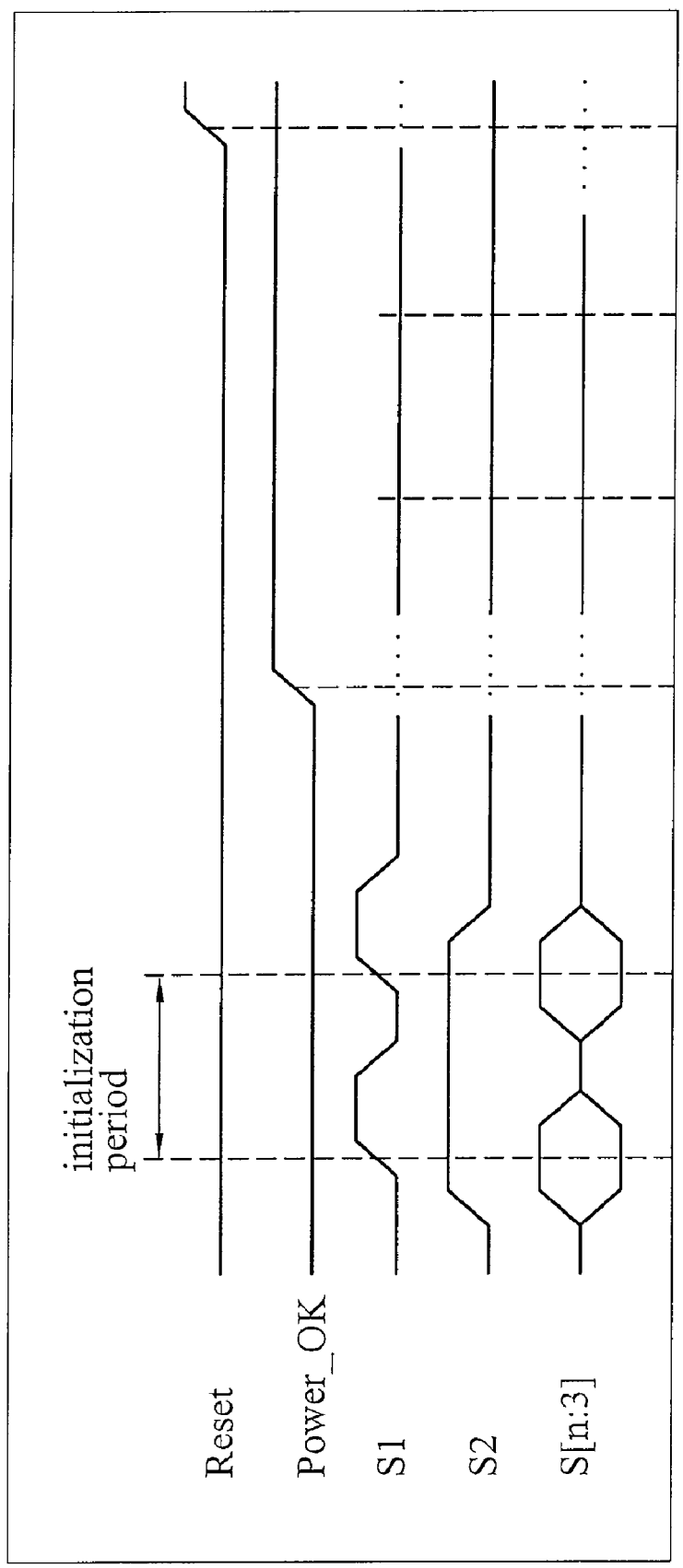
FIG. 5 is a waveform diagram of signals when a first device initially sets a second device in FIG. 3.

FIG. 5 is a waveform diagram of signals when the first device 21 initially setups the second device 22. In an initialization period from when a power supply is provided to the second device 22 to when the power-completed signal Power_OK is enabled, the first device 21 initially setups the second device 22 unitizing the initialization buses S1 to Sn.

In the initialization period, the first device 21 enables the start signal and repeatedly triggers the transmission command according to the clock frequency of the latch signal. The bus S3 to Sn is connected to the jumpers J3 to Jn by the multiplexing mechanism 212. At each rising edge of the latch signal, the bus S3 to Sn reads the level values of the jumpers J3 to Jn according to the transmission command and transmits the level values to the second device 22 to serve as the initial values. The level values of the jumpers J3 to Jn are determined according to the initial values to be transmitted. After the power-completed signal Power_OK is enabled, the second device 22 has received all initial values successfully and then starts normally.

During the start signal enabling, if the transmission command is triggered m times according to the latch signal, m×(n−2) initial values to be latched are obtained. The times of the transmission command is determined to trigger according to the number of required initial values. Note that, the initialization state must be completed before the power-completed signal Power_OK is enabled, otherwise the second device 22 is not able to operate normally. In practice, the number of strapping pins and the length of the initialization period are considered to select an applicable clock frequency of the latch signal for sufficiently triggering the transmission command. After the power-completed signal Power_OK is enabled, the multiplexing mechanism 212 switches the initialization bus S1 to Sn to the normal operation and isolates the initialization bus S1 to Sn from the jumpers J3 to Jn, such that the jumpers J3 to Jn do not affect the quality of signals during normal operation.

For example, the second device 22 requires twelve initial values, and the initialization bus S1 to Sn comprises six pins, wherein one of the six pins is used to transmit the clock frequency of the latch, another is used to transmit the start signal, and the remaining four pins are used for strapping. Thus, four jumpers are required. When the first device 21 triggers the transmission command one time, the initialization bus S1 to Sn transmits four initial values to the second device 22. Thus, the transmission command must be triggered three times to transmit twelve initial values. In the initialization period, the rising edge of the latch signal has to appear at least three times to trigger the transmission command at least three times. The second device 22 thus receives all the initial values successfully.

As described above, only n strapping pins and (n−2) jumpers are required to latch m×(n−2) initial state values by triggering the transmission command m times, decreasing the number of strapping pins and jumpers and saving space. The disclosed initialization bus necessitates use of fewer strapping pins to transmit a greater number of initial values to a device to be initialized. The initialization bus can also be applied in a test operation during manufacture by transmitting a large number of test values to a device via the initialization bus. Thus, the test operation may be more convenient.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for a first device to initialize a second device, comprising:

transmitting a latch signal by the first device to the second device and repeatedly triggering a transmission command by the first device to the second device according to a plurality of rising edges of the latch signal in an initialization period;

transmitting, by the first device, a plurality of initial values to the second device via an initialization bus according to the transmission command at each rising edge of the latch signal in the initialization period;

transmitting a start signal by the first device in the initialization period, wherein the second device begins to receive the initial values via the initialization bus when the start signal is enabled; and starting the second device according to the received initial values.

2. The method as claimed in claim 1, wherein the initialization period occurs before a power-completed signal is enabled.

3. The method as claimed in claim 1 further providing the initial values according to a plurality of level values of a jumper.

4. The method as claimed in claim 3 further comprising changing timing and function of the initialization bus and connection of the jumper after the second device receives the initial values.

5. The method as claimed in claim 1, wherein a frequency of the latch signal and the start signal are controlled by a setup device.

6. A system for a first device to initialize a second device comprising:

the first device configured to provide a latch signal to the second device;

an initialization bus coupled between the first device and the second device, wherein in an initialization period, the first device repeatedly triggers a transmission command through the initialization bus according to a plurality of rising edges of the latch signal and transmits a plurality of initial values to the second device via the initialization bus according to the transmission command; and wherein the first device transmits a start signal in the initialization period, and the second device begins to receive the initial values via the initialization bus when the start signal is enabled; and wherein the second device starts according to the received initial values.

7. The system as claimed in claim 6, wherein the initialization period occurs before a power-completed signal is enabled.

8. The system as claimed in claim 6 further comprising a jumper, wherein the initial values are provided according to a plurality of level values of the jumper.

9. The system as claimed in claim 8, wherein timing and function of the initialization bus and connection of the jumper are changed after transmitting the initial values are finished.

10. The system as claimed in claim 9, wherein the first device comprises a multiplexing mechanism for switching the timing and function of the initialization bus and the connection of the jumper.

11. The system as claimed in claim 6, wherein the first device controls a frequency of the latch signal and the start signal.

* * * * *